United States Patent [19]
Haile

[11] 3,901,587
[45] Aug. 26, 1975

[54] FRAMING AND MOUNTING MEANS FOR A REAR VISION MIRROR

[76] Inventor: Ernest Haile, 30 Cadwalader Ter., Trenton, N.J. 08618

[22] Filed: Oct. 7, 1974

[21] Appl. No.: 513,000

[52] U.S. Cl................................ 350/293; 350/303
[51] Int. Cl.² ......................................... G02B 5/10
[58] Field of Search ........... 350/293, 296, 292, 299, 350/303, 304, 302, 307; 248/481, 488; 52/627, 628

[56] References Cited
UNITED STATES PATENTS

| | | | |
|---|---|---|---|
| 2,605,676 | 8/1952 | Couch................................. | 350/293 |
| 2,857,810 | 10/1958 | Troendle............................. | 350/307 |
| 2,895,380 | 7/1959 | Kurlytis.............................. | 350/304 |
| 3,003,396 | 10/1961 | Jenkins............................... | 350/293 |
| 3,009,391 | 11/1961 | Zagieboylo et al................. | 350/292 |
| 3,170,985 | 2/1965 | Katulich............................. | 350/293 |
| 3,764,201 | 10/1973 | Haile.................................. | 350/303 |

Primary Examiner—Ronald L. Wibert
Assistant Examiner—Jon W. Henry
Attorney, Agent, or Firm—Clarence A. O'Brien; Harvey B. Jacobson

[57] ABSTRACT

A mounting plate of generally rectangular plan shape is provided and includes rounded end corner portions at opposite ends of one longitudinal side thereof and a first laterally outwardly projecting generally right-angled flange projecting outwardly of one side of the plate extending along the other longitudinal side of the plate. The central portion of the flange is of a constant height and the opposite end portions of the flange are reduced in height at increasing rates toward the terminal ends of the plate. The free marginal edge of the first flange terminates in a second generally right-angled flange projecting inwardly over the one side of the plate and an inwardly opening peripheral and channel-shaped resilient mounting gasket overlies and extends about the non-flanged marginal portions of the plate as well as the second flange with the peripheral edges of a mirror element of a plan shape corresponding to the plan shape of the plate seated in the mounting gasket. Further, the mirror element includes coextensive partial spherical end portions interconnected by means of an integral partial cylindrical center portion whose opposite ends are coextensive with the adjacent ends of the partial spherical end portions and an inwardly opening channel-shaped and peripheral mounting frame is provided and embracingly receives the outer peripheral portions of the plate and the mirror element therein with the remote surfaces of the plate and the resilient gasket opposed by the inner sides of the channel-shaped mounting frame.

6 Claims, 6 Drawing Figures

PATENTED AUG 26 1975

3,901,587

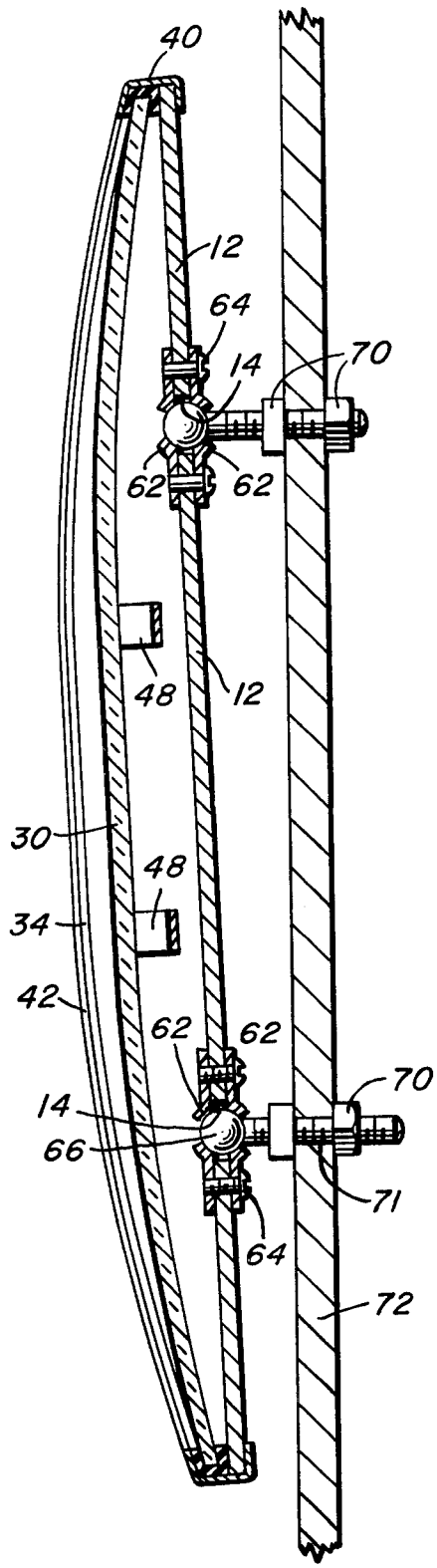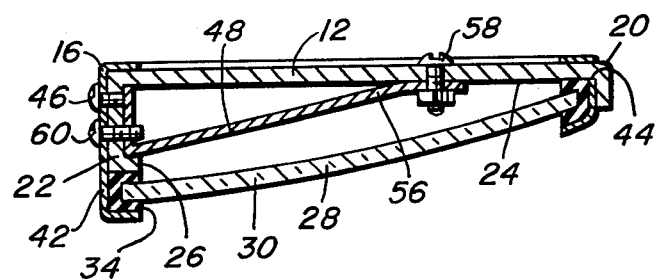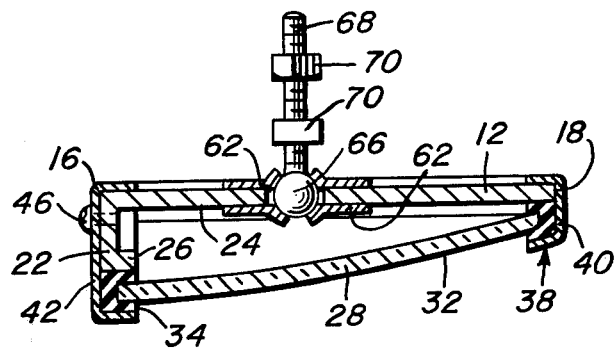

FRAMING AND MOUNTING MEANS FOR A REAR VISION MIRROR

BACKGROUND OF THE INVENTION

Mirror constructions providing horizontally widened and vertically elongated rear viewing areas have been heretofore designed. However, these previously designed mirror constructions have for various reasons not been fully capable of providing the desired end results. Examples of previously patented mirror constructions capable of affording horizontally widened and/or vertically elongated rear viewing may be found in U.S. Pat. Nos. 2,857,810, 2,890,539, 2,991,177, and 3,628,851.

BRIEF DESCRIPTION OF THE INVENTION

The invention includes a mirror element which is generally rectangular in plane shape including opposite longitudinal side edges and the opposite end portions of one of the side edges of the element curve inwardly toward and intersect with the remote ends of the other side edge of the mirror element. The end portions of the mirror element are partial spherical in configuration and the center portion of the mirror element disposed between the end portions thereof is partial cylindrical in shape and coextensive with the adjacent portions of the partial spherical end sections. The reflective surfaces of the mirror element comprise the convex surfaces thereof whereby a slightly diminished but widened horizontal image is reflected by the partial cylindrical center section of the mirror element and also slightly diminished but vertically extended images are reflected by the opposite end partial spherical mirror element sections.

A rear vision mirror of this construction is extremely effective when utilized on the side of a vehicle, in conjunction with a conventional planar interior rear vision mirror, in order to afford both vertically lengthened and horizontally widened rearward viewing areas. Such a vertically increased and horizontally increased rearward view is very helpful when navigating a tractor vehicle in reverse having a semi-trailer coupled thereto. The widened horizontal view afforded to the rear of the tractor vehicle facilitates turning movements and the increased vertical extent of the rearward view afforded by the mirror construction offers great assistance in determining necessary vertical clearances above the associated trailer vehicle and the spacing of the rear wheels of the associated tractor vehicle as well as the wheels of the trailer relative to ground obstructions.

Also, the mirror construction of the instant invention includes improved mounting frame structural features and improved mounting structure for the mounting frame whereby the mirror assembly may more readily withstand road shocks.

The main object of this invention is to provide a rear vision mirror for large over-the-road vehicles such as trucks and buses and which also may be utilized on smaller vehicles towing trailers.

Another object of this invention is to provide a rear vision mirror in accordance with the immediately preceding object and constructed in a manner whereby both a horizontally widened rear view and a vertically elongated rear view are afforded by the mirror construction.

Still another object of this invention is to provide a mirror construction including a rigid mounting plate and improved mounting means therefor whereby the mounting plate may be supported from an associated vehicle against failure due to fatigue of mounting components.

Another important object of this invention is to provide a mirror element capable of affording the aforementioned horizontally widened and vertically elongated rear view and improved structure for supporting the mirror element from the aforementioned mounting plate in a manner cushioning the mirror element from shocks experienced by the mounting plate.

A further object of this invention is to provide a side rear vision mirror assembly capable of affording horizontally widened and vertically elongated rear viewing areas and yet with the overall plan shape of the mirror assembly being maintained at a minimum without undue diminishing effect of the image afforded by the mirror element.

A final object of this invention to be specifically enumerated herein is to provide a mirror construction in accordance with the preceding objects and which will conform to conventional forms of manufacture, be of simple construction and easy to use.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged vertical sectional view taken substantially upon the plane indicated by the section line 4—4 of FIG. 2;

FIG. 5 is a horizontal sectional view on somewhat of an enlarged scale taken substantially upon the plane indicated by the section line 5—5 of FIG. 2; and FIG. 6 is an enlarged horizontal sectional view taken substantially upon the plane indicated by the section line 6—6 of FIG. 2.

DETAILED DESCRIPTION OF THE PREFERRED EMBODIMENT

Figure 1:
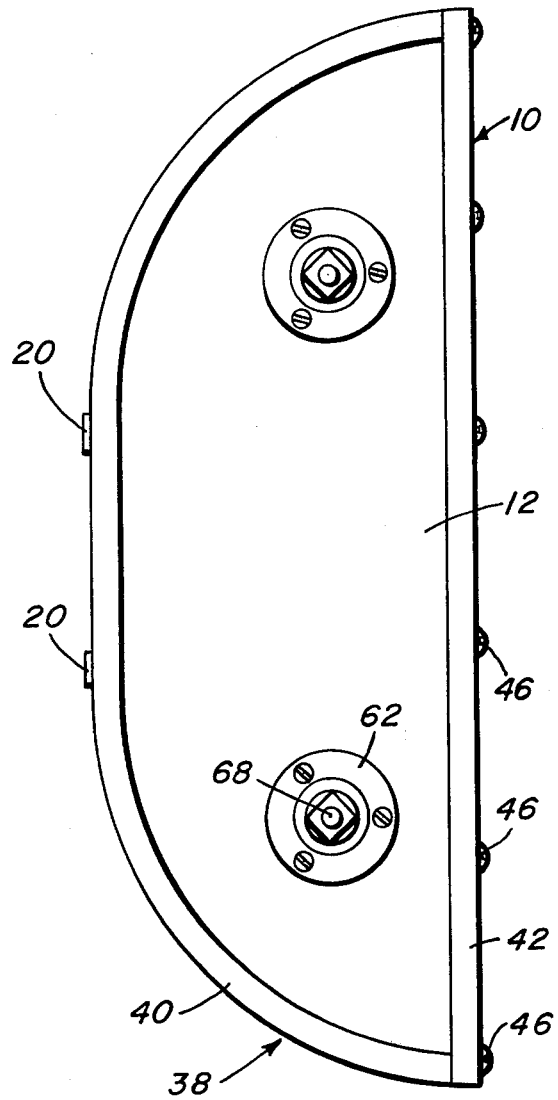
FIG. 1 is a rear plan view of the mirror construction of the instant invention.
Figure 2:
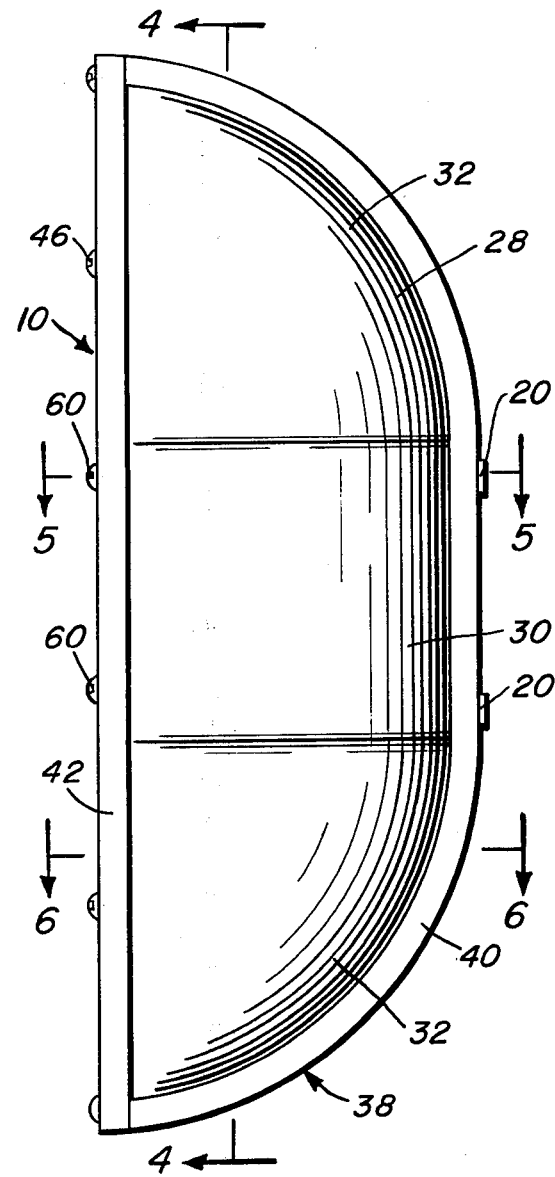
FIG. 2 is a front plan view of the mirror construction of the instant invention.
Figure 3:
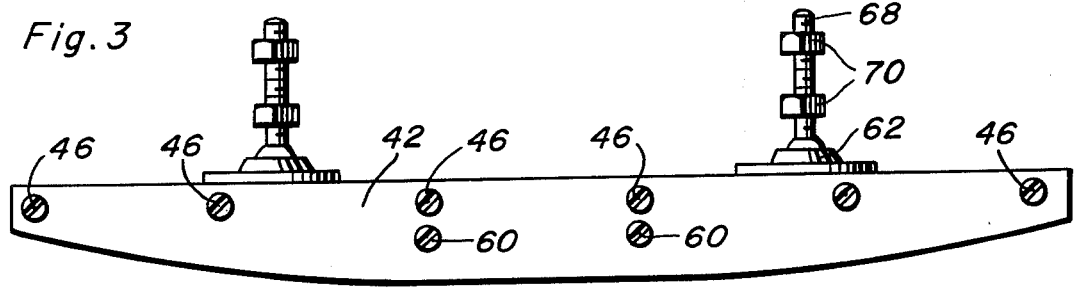
FIG. 3 is an edge elevational view of the mirror construction as seen from the right side of FIG. 1.

Referring now more specifically to the drawings the numeral 10 generally designates the mirror construction of the instant invention. The mirror construction 10 includes a rigid base plate 12 having a pair of longitudinally spaced openings 14 formed therethrough. The base plate 12 is generally rectangular in plan shape and includes a first straight longitudinal side marginal portion 16 and a second longitudinal side marginal portion 18 including a straight central portion and curved opposite end portions whose remote ends intersect with and are disposed at substantially right angles relative to the opposite sides of the straight side marginal portion 16.

The straight central portion of the marginal edge portion 18 includes a pair of longitudinally spaced outwardly projecting tabs 20 and the straight marginal portion 16 includes a first laterally directed flange 22 extending therealong and projecting outwardly of the front side 24 of the plate 12. The central portion of the first flange 22 is constant in width and the opposite end portions of the flange 22 are reduced in width at increasing rates toward the terminal ends of the flange 22. Further, the forward marginal edge portion of the flange 22 remote from the plate 12 includes a right-angled inwardly directed second flange 26.

A mirror element 28 is provided and is of substantially the same plan shape as the plate 12, although the overall size of the mirror element 28 is slightly less than the size of the plate 12. The mirror element 28 includes a partial cylindrical center section 30 and a pair of opposite end partial spherical end sections 32. The opposite ends of the center section 30 are co-extensive with and smoothly merge into the adjacent portions of the end sections 32 and a channel-shaped inwardly opening resilient peripheral gasket 34 is disposed about and embracingly engages the peripheral edges of the mirror element 28.

As may best be seen from FIGS. 4, 5 and 6 the mirror element 28 is disposed over the front side 24 of the plate 20 with the rear surfaces of the gasket 34 abutted against the forward surfaces of the side marginal edge 18 (including the straight center portion thereof at the curved opposite end portions thereof) and the forward side of the second flange 22. Also, a channel-shaped and peripherally extending mounting frame referred to in general by the reference numeral 38 is provided. The frame 38 opens inwardly and includes a first section 40 thereof which extends along the longitudinal side marginal edge 18 including the straight central portion thereof and the curved opposite end portions thereof and a second section 42 which extends along the side marginal edge portion 16 and the flange 22 of the plate 12. The channel-shaped mounting frame embracingly engages corresponding marginal portions of the assembly comprising the base plate 12, the mirror element 28 and the channel-shaped gasket 34.

That portion of the first section 40 which extends along the straight center portion of the side marginal portion 18 is provided with a pair of longitudinally spaced openings 44 through which the tabs 20 extend and the free ends of the tabs 20 are bent forwardly over the outer surfaces of the adjacent portions of the first section 40 of the mounting frame 38. The second straight section 42 of the mounting frame 38 includes a constant width central section and opposite end sections which gradually decrease in width according to the decrease in width of the corresponding portions of the first flange 22 and the second section 42 is secured to the first flange 22 by means of threaded fasteners 46 secured through the second section 42 and the flange 22. Also, a pair of inclined braces 48 are provided and spaced longitudinally of the plate 12. The braces 48 are elongated and extend transversely of the plate 12 having a first pair of end portions 50 secured to the front surface 24 of the plate 12 by means of suitable fasteners 58. The second ends of the braces 48 are secured to the inner surface of the first flange 22 by means of suitable fasteners 60. Also, ball element retaining plates 62 are secured over the front and rear surface portions of the plate 12 disposed about the openings 14 by means of suitable fasteners 64 and clampingly engage ball-shaped terminal ends 66 carried by corresponding end portions of threaded mounting studs 68, the studs 68 each having a pair of mounting nuts 70 threadedly engaged therewith whereby the mounting studs 68 may be rigidly secured through bores 71 formed in an associated supporting structure 72.

By supporting the mounting plate 12 through the utilization of adjustable mounting studs including ball element terminal ends universally supported from the plate 12, an extremely rigid and durable mounting of the plate 12 from the support structure 72 is provided. In addition, in view of the channel-shaped mounting flange 38 and the channel-shaped peripheral gasket 34, the mirror element 28 is supported from the mounting plate 12 in a manner cushioning the mirror element 28 from shocks experienced by the mounting plate 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is:

1. A mirror construction comprising a mirror element including first and second opposite side edges, a mounting plate of a plan shape corresponding to the plan shape of said element over one side of which said element is placed in plan registry therewith, shock absorbing means extending about the peripheries of said plate and element supporting said element from said plate in a manner cushioning said mirror element from shock experienced by said plate, said plate including first and second opposite side edges, one of said plate side edges corresponding to one of said element side edges, the other side edge of said plate corresponding to the other side edge of said element and including a right-angulated first flange extending therealong and projecting outwardly of said one side of said plate, said first flange including opposite end portions which progressively decrease in width toward said plate at continuously increasing rates, the free longitudinal edge portion of said first flange terminating outwardly in a second inwardly directed right-angulated flange overlying said one side of said plate, said shock absorbing means including a resilient inwardly opening and channel-shaped peripheral gasket extending about said mirror element and embracingly engaging the peripheral edges thereof with one side of said gasket abutting the opposing peripheral surfaces of said one side of said plate, and inwardly opening and channel-shaped peripheral mounting frame extending about the peripheries of said plate and gasket and embracingly engaging the remote sides thereof, said mounting frame including a pair of elongated channel-shaped sections, one of said sections extending along said one side edges of said plate and mirror element and the other frame section extending along the other side edges of said plate and mirror element, said one side of said gasket including portions thereof abuttingly engaged with the outer surface of said second flange, said mirror element including partial spherical opposite ends with said element being outwardly convex away from said one side of said plate, said other side edge of said plate being generally straight, said one sides of said plate and element including opposite end portions which converge toward the corresponding opposite ends of said other side edges of said plate and element, said plate including mounting means spaced inwardly from the marginal edges thereof for providing the sole support of said mirror construction from a suitable support structure.

2. The combination of claim 1 wherein said mounting means includes a pair of threaded mounting studs spaced apart longitudinally of said plate and including corresponding base and free end portions, said base end portions and said plate including coacting means universally swivally supporting said base end portions of said studs from said plate.

3. A mirror construction comprising a mirror element of generally rectangular plan shape including opposite longitudinal side edges, said element including a partial cylindrical center transversely extending section and a pair of co-extensive opposite end sections of partial spherical shape, said center and end sections having the same radius of curvature, one longitudinal side of said mirror element, when the latter is viewed in plan, including a generally straight central portion and substantially constant radius opposite end portions whose adjacent ends merge smoothly into the opposite ends of said central portion, the opposite ends of said curved portions terminating at the opposite ends of the other longitudinal side of said element at generally right angles relative thereto, a mounting plate of a plan shape corresponding to the plan shape of said element over one side of which the concave side of said element is placed in plan registry therewith, and shock absorbing means extending about the peripheries of said plate and element supporting said element from said plate in a manner cushioning said mirror element from shocks experienced by said plate, said plate including opposite longitudinal side edges, one of said side edges corresponding to said one longitudinal side of said mirror element, the other side edge of said plate including a right-angulated first flange extending therealong and projecting outwardly of said one side of said plate, said first flange including a constant width central portion and opposite end portions which progressively decrease in width toward the opposite ends of said other side edge of said plate at continuously increasing rates, the free longitudinal edge portion of said first flange terminating outwardly in a second inwardly directed right-angled flange overlying said one side of said plate, said shock absorbing means including a resilient inwardly opening and channel-shaped peripheral gasket extending about said mirror element and embracingly engaging the peripheral edges thereof with one side of said gasket abutting the opposing peripheral surfaces of said one side of said plate, and an inwardly opening and channel-shaped peripheral mounting frame extending about the peripheries of said plate and gasket and embracingly engaging the remote sides thereof, said mounting frame including a pair of elongated channel-shaped sections, one of said sections extending along said one side edges of said plate and mirror element and the other frame section extending along the other side edges of said plate and mirror element, said one side of said gasket including portions thereof abuttingly engaged with the outer surface of said second flange.

4. The combination of claim 3 including inclined braces extending transversely of said plate outwardly of said one side thereof and spaced longitudinally of said plate, said braces including a first set of corresponding ends anchored to the inner surfaces of said first flange and a second set of corresponding ends anchored to said one side of said plate intermediate the opposite longitudinal side edges thereof.

5. A mirror construction comprising a mirror element of generally rectangular plan shape including opposite longitudinal side edges, said element including a partial cylindrical center transversely extending section and a pair of co-extensive opposite end sections of partial spherical shape, said center and end sections having the same radius of curvature, one longitudinal side of said mirror element, when the latter is viewed in plan, including a generally straight central portion and substantially constant radius opposite end portions whose adjacent ends merge into the opposite ends of said central portion, the opposite ends of said curved portions terminating at the opposite ends of the other longitudinal side of said element at generally right angles relative thereto, a mounting plate of a plan shape corresponding to the plan shape of said element over one side of which the concave side of said element is placed in plan registry therewith, and shock absorbing means extending about the peripheries of said plate and element supporting said element from said plate in a manner cushioning said mirror element from shocks experienced by said plate, said shock absorbing means including a resilient inwardly opening and channel-shaped peripheral gasket extending about said mirror element and embracingly engaging the peripheral edges thereof with one side of said gasket abutting the opposing peripheral surfaces of said one side of said plate, and an inwardly opening and channel-shaped peripheral mounting frame extending about the peripheries of said plate and gasket and embracingly engaging the remote sides thereof, said mounting frame including a pair of elongated channel-shaped sections, one of said sections extending along the corresponding straight side longitudinal edges of said plate and mirror element and the other frame section extending along the remaining corresponding peripheral edges of said plate and mirror element, the longitudinal edge of said plate corresponding to said one longitudinal side of said mirror element including longitudinally spaced outwardly projecting bendable tabs, said other section of said mounting frame including longitudinally spaced openings formed therein through which the outer ends of said tabs project, the outer tab ends being bent laterally of the medial plane of said plate over the adjacent outer surfaces of said other frame section.

6. The combination of claim 5 wherein said plate includes a pair of threaded mounting studs spaced apart longitudinally of said plate and including corresponding base and free end portions, said base end portions and said plate including coacting means universally swivally supporting said base end portions of said studs from said plate.

* * * * *